W. E. DAVIS.
ANTISKID DEVICE.
APPLICATION FILED MAY 21, 1920.
1,405,672.
Patented Feb. 7, 1922.
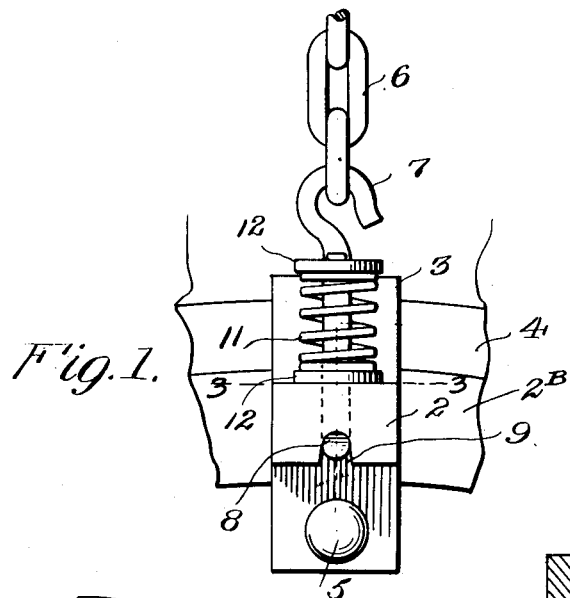
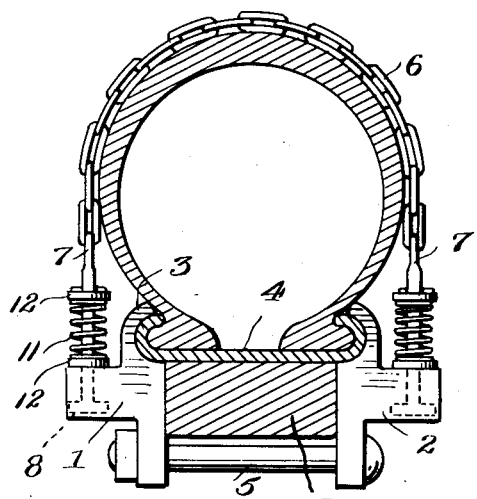
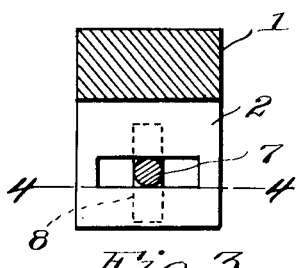
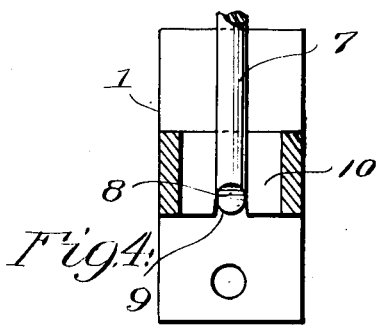
INVENTOR.
W. E. Davis.
BY Victor J. Evans
ATTORNEYS.

UNITED STATES PATENT OFFICE.

WILLIAM E. DAVIS, OF GENESEE, MICHIGAN.

ANTISKID DEVICE.

1,405,672.  Specification of Letters Patent.  Patented Feb. 7, 1922.

Application filed May 21, 1920. Serial No. 383,204.

*To all whom it may concern:*

Be it known that I, WILLIAM E. DAVIS, a citizen of the United States, residing at Genesee, in the State of Michigan, have invented new and useful Improvements in Antiskid Devices, of which the following is a specification.

This invention relates to an anti-skid device for use with automobile tires and has for its primary object the construction of a device of this character that can be more quickly connected to a tire and more efficient in its operation.

An object of the invention is the construction of an anti-skid device of two parts, the one of which is permanently connected to the wheel so that when occasion demands the other part may be quickly connected.

A feature of the invention is the novel manner of connecting each end of the chain to a clip so that the chain will be positively held against accidental removal in the use of the device but may be readily disconnected by manually forcing certain elements in a certain direction.

With these and other objects in view the invention will be better understood from the following detailed description taken in connection with the accompanying drawing wherein:

Fig. 1 is a side elevation of the device.

Fig. 2 is a vertical sectional view through a tire rim and felly showing my invention applied thereto.

Figure 3 is a sectional view on the line 3—3 of Fig. 1.

Figure 4 is a sectional view on the line 4—4 of Fig. 3.

Again referring to the drawing illustrating one construction of my invention the numerals 1 and 2 designate a pair of clips of a shape to bind against the side of the felly 2$^B$ and having flanges 3 engaging the flange of the rim 4. A bolt 5 is arranged to direct the clips into binding engagement with the flange and rim. The clips and bolt form a part that is permanently connected to the wheel. The detachable part consists of a chain section 6 having its end links connected to hook members 7. Each hook member has one end formed into T 8 so as to detachably engage the recess 9 in the clip and be forced through the slot 10 so as to detach the hook members from the clips. A coil spring 11 acting upon the washers 12 yieldably forces the hook member into position to prevent accidental disengagement between the hook members and the clips.

From the foregoing description it will be seen that when my anti-skid device is being used it is only necessary to take the chain section and force same around the tire and the hooks through the slots 10 into their proper connection with the recess 9. If a tighter connection is to be accomplished between the chain section and the tire the latter may be relieved of air pressure so that the connection may be made, when air is again forced into the tire the pressure thereof will direct the various parts into engagement. For ordinary use it will not be necessary to remove the air as the chain section will automatically move into position to bring about proper engagement to prevent skidding of the tire.

It is, of course to be understood that the invention may be constructed in various other manners and the parts associated in different relations and therefore, I do not desire to be limited in any manner except as set forth in the claims hereunto appended.

Having thus described my invention what I claim is:

1. An anti-skid device for automobiles comprising a pair of clips each shaped to engage the rim and felly of a wheel, a bolt for binding the clips into engagement with the felly and rim, a chain section, and a device for detachably connecting each end of the chain to a clip consisting of a hook having a T shape end detachably engaging the clip, and a spring arranged to force the hook into a direction to prevent accidental disengagement between the hook and clip.

2. An anti-skid device for automobile tires comprising a tread member passing around the tire, clips for detachable engagement with the wheel felly of the tire, and devices connecting said tread member to the clip and capable of moving to two positions at right angles to each other for attaching or detaching the devices from the clip, and a spring arranged to normally hold the devices in attaching position.

In testimony whereof I affix my signature.

WILLIAM E. DAVIS.